United States Patent
Seaba et al.

(10) Patent No.: US 12,434,965 B2
(45) Date of Patent: Oct. 7, 2025

(54) LIQUID PHASE REFORMING OF OXYGENATES FOR HYDROGEN PRODUCTION

(71) Applicant: Gas Technology Institute, Des Plaines, IL (US)

(72) Inventors: James Seaba, Barrington, IL (US); Osman Akpolat, Northbrook, IL (US)

(73) Assignee: GTI Energy, Des Plaines, IL (US)

( * ) Notice: Subject to any disclaimer, the term of this patent is extended or adjusted under 35 U.S.C. 154(b) by 958 days.

(21) Appl. No.: 17/355,947

(22) Filed: Jun. 23, 2021

(65) Prior Publication Data

US 2022/0063997 A1  Mar. 3, 2022

Related U.S. Application Data

(60) Provisional application No. 63/070,538, filed on Aug. 26, 2020.

(51) Int. Cl.

| | | |
|---|---|---|
| *C01B 3/32* | (2006.01) | |
| *B01J 19/08* | (2006.01) | |
| *C01B 32/50* | (2017.01) | |

(52) U.S. Cl.
CPC ............. *C01B 3/323* (2013.01); *B01J 19/088* (2013.01); *C01B 32/50* (2017.08); *B01J 2219/0809* (2013.01); *B01J 2219/0877* (2013.01); *C01B 2203/0227* (2013.01); *C01B 2203/0415* (2013.01); *C01B 2203/0475* (2013.01); *C01B 2203/1223* (2013.01); *C01B 2203/1229* (2013.01)

(58) Field of Classification Search
CPC ......... C01F 11/18; C01F 11/182; C01B 3/323
See application file for complete search history.

(56) References Cited

U.S. PATENT DOCUMENTS

| | | | |
|---|---|---|---|
| 5,037,511 | A | 8/1991 | Dornhagen et al. |
| 6,576,217 | B1 * | 6/2003 | Nojima ............... B01J 23/80 |
| | | | 502/343 |
| 6,607,707 | B2 | 8/2003 | Reichman et al. |
| 6,699,457 | B2 | 3/2004 | Cortright et al. |
| 6,890,419 | B2 | 5/2005 | Reichman et al. |
| 6,964,757 | B2 | 11/2005 | Cortright et al. |
| 6,964,758 | B2 | 11/2005 | Cortright et al. |
| 6,994,839 | B2 | 2/2006 | Reichman et al. |
| 7,481,992 | B2 | 1/2009 | Reichman et al. |
| 7,618,612 | B2 | 11/2009 | Cortright et al. |
| 8,318,130 | B2 | 11/2012 | Grimes et al. |
| 8,419,922 | B2 | 4/2013 | Grimes |
| 8,451,630 | B2 | 5/2013 | Nania et al. |
| 8,828,216 | B2 | 9/2014 | Grimes |
| 2004/0034255 | A1 | 2/2004 | Shoji |
| 2005/0163704 | A1 | 7/2005 | Reichman et al. |
| 2009/0266717 | A1 | 10/2009 | Grimes et al. |

FOREIGN PATENT DOCUMENTS

CA             787831 A      6/1968

* cited by examiner

*Primary Examiner* — Stuart L Hendrickson
(74) *Attorney, Agent, or Firm* — Banner & Witcoff, Ltd.

(57) ABSTRACT

In the liquid phase reforming (LPR) of oxygenated C,H-containing compounds such as alcohols, various strategies are disclosed for managing byproduct $CO_2$. Important processing options include those in which electrolyte, consumed in capturing or precipitating the $CO_2$ generated from LPR, is regenerated or not regenerated, with carbon emissions potentially being avoided in the latter case. With regeneration, different chemistries are possible, such as in the case of a regeneration cycle utilizing hydroxide anions to precipitate a solid, carbonate form of $CO_2$ that is generated from reforming. Alternatively, a reaction and regeneration system may use carbonate anions to "capture" $CO_2$ and thereby maintain it as aqueous, solubilized bicarbonate form.

18 Claims, 2 Drawing Sheets

LIQUID PHASE REFORMING OF OXYGENATES FOR HYDROGEN PRODUCTION

CROSS-REFERENCE TO RELATED APPLICATIONS

This application claims priority to U.S. provisional application No. 63/070,538, filed Aug. 26, 2020, which is incorporated by reference in its entirety.

FIELD OF THE INVENTION

The present invention relates to processes for reforming of oxygenated, carbon- and hydrogen-containing compounds (i.e., oxygenated C,H-containing compounds, which include alcohols such as methanol and ethanol) to produce hydrogen. Particular aspects relate to options for the management and recovery of $CO_2$ that is a co-product of reforming.

BACKGROUND OF THE INVENTION

Significant quantities of hydrogen are demanded in the chemical production and petroleum refining industries. For example, in chemical production, hydrogen is used as a reactant with nitrogen via the Haber process to produce ammonia. This intermediate can then be converted to ammonium nitrate, a valuable component of soil fertilizer. In refining, hydrogen is essential for upgrading hydrocarbon fractions derived from crude oil, according to a number of hydroprocessing operations. These include hydrocracking to reduce hydrocarbon molecular weight and yield desirable transportation fuels (e.g., gasoline), as well as hydrotreating to remove unwanted contaminants such as sulfur- and nitrogen-containing compounds. Particularly in view of the increasing need for low sulfur fuels due to environmental concerns, the use of hydrogen in refineries is expected to grow. A number of different approaches for hydrogen production are being investigated, and these include biomass pyrolysis and gasification, in addition to biological processes, such as bacterial fermentation and enzymatic hydrogen production. Electrolysis is another technology for making hydrogen, together with oxygen, by the decomposition of water. Currently, however, the commercial production of hydrogen is based on the oxidation of methane according to a process known as steam methane reforming (SMR). Water ($H_2O$) that is present in vapor form under the elevated temperatures used, typically 600° C.-900° C., serves as the oxidant, according to the reaction:

$$CH_4+H_2O(vapor) \rightarrow CO+3H_2.$$

Hydrogen production based on vapor phase SMR, however, requires significant power consumption, in addition to high operating temperatures and pressures.

In view of these drawbacks, liquid-phase reforming (LPR), also termed aqueous-phase reforming (APR), has been proposed as an alternative for generating hydrogen in an aqueous reaction medium from biomass-derived resources. Advantages of this hydrogen production route include its applicability to either wet or water-soluble feedstocks, coupled with the effectiveness of carrying out the water-gas shift (WGS) reaction within the same reaction environment as reforming, effectively reducing the production of byproduct CO. Moreover, compared to conventional alkane stream reforming, LPR can utilize substantially milder reaction temperatures (e.g., below 300° C.), which, in combination with elevated pressure, can preclude the evaporation of water. LPR, unlike conventional steam reforming, can also exploit electrochemical pathways to promote hydrogen production. Further benefits can be realized from cost savings due to the elimination of a compressor and its operation, as well as simplified downstream processing requirements, for obtaining hydrogen with acceptable purity.

To date, feedstocks that have been investigated for use in LPR include bio-derived compounds such as alcohols and carbohydrates, specific examples of which are methanol, ethanol, ethylene glycol, glycerol, butanol, sorbitol, mannitol, and xylitol. Research in the area of suitable catalyst formulations has also been ongoing and active. The reforming of methanol in an aqueous reaction medium, for example, can proceed according to the reaction:

$$CH_3OH(liquid)+H_2O(liquid) \rightarrow 3H_2+CO_2,$$

and similar reaction pathways are available for converting other oxygenated compounds to hydrogen and $CO_2$, via their reaction with water. These compounds include higher alcohols such as ethanol, as well as dimethyl ether (DME) that can be produced from methanol according to the dehydration reaction $$2CH_3OH \rightarrow CH_3OCH_3+H_2O,$$

with catalysts and conditions for conducting this reaction being described, for example, in U.S. Pat. No. 5,037,511; US 2004/0034255; and U.S. Pat. Nos. 8,451,630.

In the field of LPR, Canadian Patent No. 787831 teaches a liquid phase process conducted preferably in alkaline aqueous electrolytes such as hydroxides, for hydrogen production by reforming various oxidizable fuels, which include alcohols and other organic feedstocks such as biomass. Conductive catalysts are taught to promote reforming reactions by activating electrochemical pathways, such that this liquid phase reforming is referred to as electrochemical reforming (ECR). More recent disclosures are found in U.S. Pat. Nos. 6,607,707; 6,699,457; 6,890,419; 6,964,757; 6,964,758; 6,994,839; 7,618,612, and U.S. Application Publication No. 2005/0163704, which teach the liquid phase reforming of hydrocarbons, oxygenated hydrocarbons such as alcohols and sugars, as well as biomass, to make hydrogen using various ionic conducting electrolytes in the liquid phase. Conductive catalysts, such as those having transition metals, are disclosed for this purpose. These patent publications vary in terms of specific process parameters, including the pH of the electrolyte reaction medium and the use of an electrochemical cell with applied external voltage, to promote the production of hydrogen.

Aside from the above-noted advantages of LPR over conventional SMR in terms of process conditions and equipment needed, practical considerations also favor the use of liquid feedstocks over methane. For example, the transport of methane as liquefied natural gas (LNG), particularly via tankers, involves considerable expense relative to the transport of products that are liquids at room temperature. This is due not only to the structural complexities in tankers designed to contain LNG, but also to the serious safety and liability issues in the event of a spill on a waterway.

Despite these potential benefits of LPR and the progress made to date in developing this technology, there is an ongoing need for improvements to establish commercial viability. A key concern in this endeavor is the management of the byproduct $CO_2$ and the tradeoffs that exist between allowing its contamination of the hydrogen product and undertaking measures to capture or sequester it in liquid or solid phases, using the appropriate electrolytes/conditions.

SUMMARY

Aspects of the invention are associated with the recognition of various strategies for managing byproduct $CO_2$ in the liquid phase reforming (LPR) of oxygenated C,H-containing compounds, and more preferably compounds comprising only C, H, and O atoms, which can be used as "fuels" in the production of hydrogen via reaction with water present in an aqueous reaction medium. Alcohols are exemplary compounds in that they are easily miscible with water and alkaline electrolytes such as hydroxides, thereby minimizing limitations in terms of mass transfer to catalyst sites. Important processing options include those in which electrolyte, consumed in capturing or precipitating the $CO_2$ generated from LPR, is not regenerated and the associated carbon emissions are avoided. Otherwise, the regeneration of the electrolyte can allow for the recovery of a high-purity $CO_2$ gas stream. For example, in the case of operation under conditions of high pH (e.g., >10), an electrolyte comprising hydroxide anions may be regenerated, whereas operation under lower pH conditions (e.g., <10) may involve the regeneration of an electrolyte comprising carbonate anions.

Therefore, a given regeneration system can utilize different chemistries, including a regeneration cycle in which hydroxide anions are used to precipitate a solid, carbonate form of $CO_2$ that is generated from reforming. In a separate step (e.g., separate vessel) removed from the reforming reaction and/or any post-reforming zone or post-reforming reactor, downstream of this reaction, the carbonate form may be heated to obtain the corresponding oxide form, with the liberation of this $CO_2$ as a separate high-purity, gaseous product. Hydrolyzing of the oxide form may then be used to regenerate the corresponding hydroxide. In an alternative manner of preventing $CO_2$ that is generated from reforming from contaminating the gaseous $H_2$ product, a reaction and regeneration system may use carbonate anions to "capture" $CO_2$ and thereby maintain it as an aqueous, solubilized bicarbonate form. In a separate step (e.g., separate vessel) removed from the reforming reaction and/or any post-reforming zone or post-reforming reactor, the carbonate form may be regenerated under the appropriate reaction (e.g., adsorption) conditions, with the liberation of the generated $CO_2$ as a separate high-purity, gaseous product.

The formation of insoluble carbonates from hydroxide anions, as opposed to the formation of solubilized bicarbonates from carbonate anions, according to alternative regeneration systems described herein, may be determined by the particular pH and cations selected for a given application. In general, for any given cation, in increase in pH of the reaction medium will tend to result in the formation of a precipitated (sequestered) carbonate form of the $CO_2$ generated from reforming, as opposed to a solubilized (captured) bicarbonate form. Depending on the particular conditions used throughout a given cycle of reforming, optional post-reforming, and regeneration, the same $CO_2$-precipitating cation or $CO_2$-capturing cation may be used, in view of this cation having differing solubilities in the differing forms (e.g., hydroxide, carbonate, bicarbonate) and differing conditions (e.g., pH). Particularly when comparing regeneration systems utilizing one selected cation (e.g., $Ca^{+2}$), those systems involving the formation of precipitated carbonates through the use of a $CO_2$-precipitating cation therefore typically operate with higher pH values, relative to those involving the formation of solubilized bicarbonates through the use of a $CO_2$-capturing cation. According to some embodiments, a "hybrid" regeneration system may be utilized to obtain the benefits of both the precipitation and solubilization of $CO_2$ generated from reforming, as well as the added ability to allocate the relative amounts of $CO_2$ for handling with each of these techniques.

Advantages of processes according to particular embodiments therefore reside in flexibility, in terms of options for recovering $H_2$ and $CO_2$, generated from liquid phase reforming, as well as the ability to tailor operating parameters to achieve a desired balance between reaction severity (e.g., pressure and pH) and purity/recovery/quality of the $H_2$ and $CO_2$ products. For example, the reforming reaction may be operated a pressure at or exceeding 50 megapascals (MPa) to generate a highly pure $H_2$ stream (e.g., having less than 1 vol-ppm CO and/or $CO_2$) at this pressure. Such high pressures may be advantageous for maintaining the reaction medium in the liquid phase under elevated reforming temperatures. In certain embodiments, reforming conditions that include a high pH of the reaction medium (e.g., at least about 15) can ensure a high efficiency of production of a precipitated carbonate form the $CO_2$ that is generated from reforming, thereby allowing for the effective physical sequestration of $CO_2$, beyond merely capturing this product to prevent its release as a gas. This likewise improves $H_2$ purity and has the added benefit of providing a high purity, solid carbonate if desired as an end product. In terms of reforming temperature, the effective range may be dramatically increased according to embodiments in which an electrochemical cell is incorporated into a reforming reactor or reforming zone. In the case of the reforming reaction being driven thermally, an elevated temperature in this reactor or zone, such as a temperature, or average temperature, in the range from about 140° C. to about 300° C. may be used. With the added flexibility of driving the reforming reaction electrically using an applied voltage, lower temperatures are possible, for example down to those at which the reaction medium is nearly solidified. A combination of thermal and electrical inputs may therefore advantageously allow for LPR to be carried out over a wide range of temperatures, such as an average temperature in the reforming reactor or zone from about −40° C. to about 140° C. Overall, it can be appreciated that processes described herein can beneficially provide immediate hydrogen generation over a wide range of operating temperatures and pressures.

Other aspects of the invention relate to the ability to manipulate or modify conditions, either those used for reforming (e.g., in a reforming reactor or reforming zone) or otherwise used following reforming (e.g., in a post-reforming reactor or post-reforming zone) to impact the solubility of various species present in the reaction medium, or electrolyte solution, that is used to transfer reactants (e.g., methanol and water) and reaction products (e.g., a precipitated carbonate form of $CO_2$ and/or a captured bicarbonate form of $CO_2$). Such manipulation or modification may include the addition of a further amount of $CO_2$-precipitating cations, or otherwise the addition of solubilizing cations (e.g., alkali metal cations such as $Na^+$ and $K^+$) that may act as further amounts of $CO_2$-capturing cations. The modifying of a condition of the electrolyte solution may alternatively include a pH adjustment, such as by the addition of a pH-adjusting anion, and/or a temperature adjustment. In an exemplary embodiment, the addition of a further amount of $CO_2$-precipitating cations and/or pH-adjusting cations results in the precipitation of a solid, carbonate form of the $CO_2$ generated in the upstream reforming reactor or reforming zone. This precipitation may therefore occur in the post-reforming reactor or post-reforming zone, and in this case, a post-reforming effluent that is withdrawn from this reactor or zone may be subsequently fed to a solid-liquid separator to separate the solid precipitate from an aqueous filtrate that is itself an electrolyte solution. This solution, in turn, may be returned to the post-reforming reactor or post-reforming zone to induce further precipitation, and/or may be returned to the reforming reactor or reforming zone to replenish the reaction medium in this reactor/zone and/or provide $CO_2$-precipitating cations and/or $CO_2$-capturing cations to this reactor/zone.

Yet further benefits arise from integration of LPR processes described herein with applications in which a hydrogen having a high purity (e.g., at least about 90 vol-% or even at least about 99 vol-%) is required. Such applications include the operation of fuel cells and associated stations for hydrogen fuel cell vehicles (FCVs), as well as refinery hydroprocessing units. Integration can involve economies that result from heat integration as well as proximity to sources for convenient export of products, such as high-purity $CO_2$.

These and other aspects, embodiments, and associated advantages will become apparent from the following Detailed Description.

BRIEF DESCRIPTION OF THE DRAWINGS

A more complete understanding of the exemplary embodiments of the present invention and the advantages thereof may be acquired by referring to the following description in consideration of the accompanying figures.

The figures should be understood to present an illustration of the disclosure and/or principles involved. In order to facilitate explanation and understanding, simplified equipment is depicted in the schematic illustrations of FIGS. 1 and 2, and these figures are not necessarily drawn to scale, such that some components and structures, as well details pertaining to their configurations, may be exaggerated. Valves, instrumentation, and other equipment and systems not essential to the understanding of the various aspects of the invention are not shown. As is readily apparent to one of skill in the art having knowledge of the present disclosure, processes for performing liquid phase reforming within the scope of the invention will have configurations and components determined, in part, by their specific use. In FIGS. 1 and 2, the same reference numbers are used to identify the same or similar features.

DETAILED DESCRIPTION OF EMBODIMENTS

Figure 1:
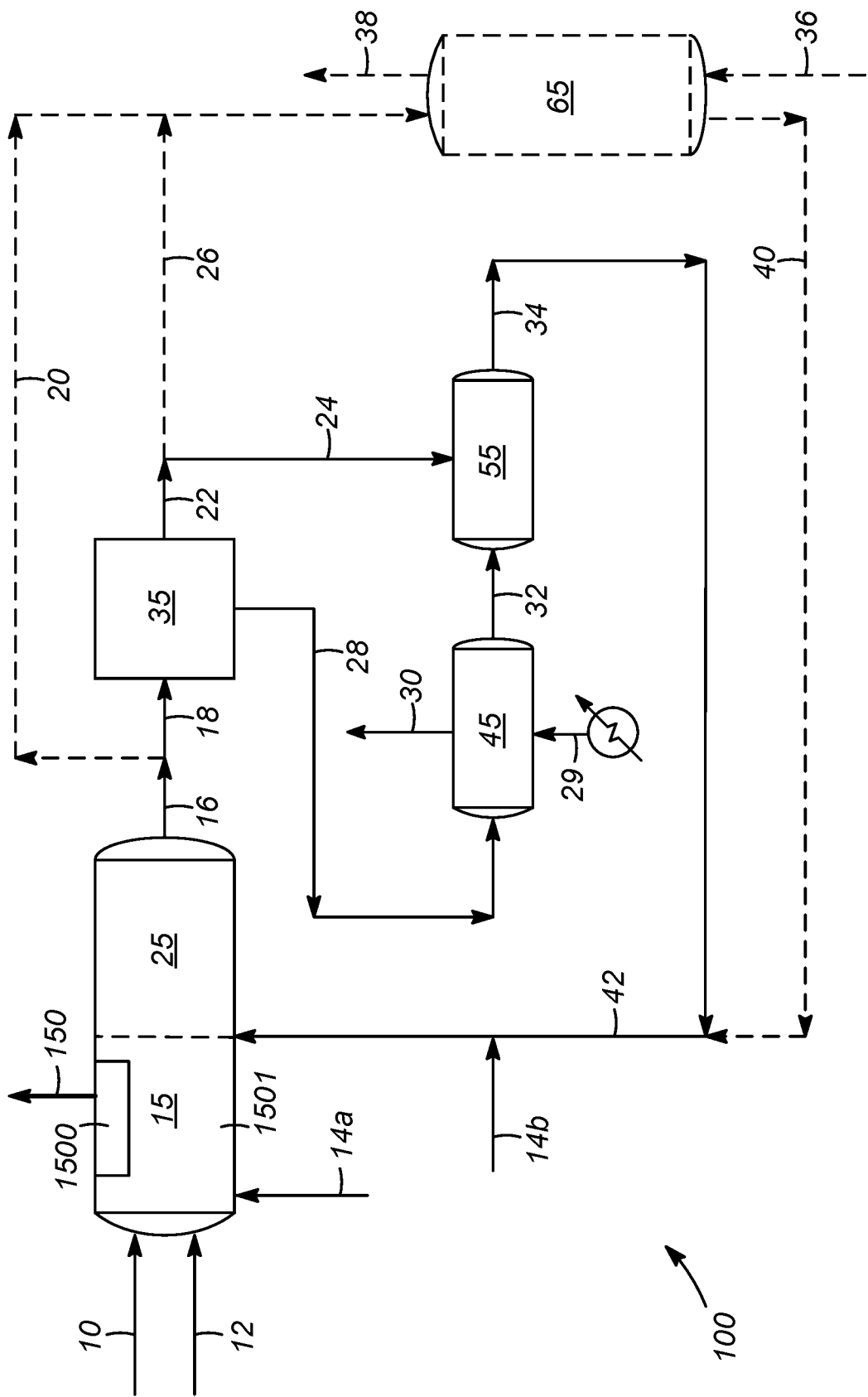
FIG. 1 depicts a flowscheme that illustrates a representative liquid phase reforming (LPR) process, with options for recovering the generated $CO_2$, by initially producing a precipitated form and/or a solubilized form of this $CO_2$.

The expressions "wt-%" and "vol-%," are used herein to designate weight percentages and volume percentages, respectively. The expressions "wt-ppm" and "vol-ppm" are used to designate weight parts per million and volume parts per million, respectively. Concentrations of liquid phase components are generally reported in terms of wt-% (or wt-ppm), whereas concentrations of gas phase components are generally reported in terms of vol-% (or vol-ppm). For ideal gases, "vol-%" is equal to molar percentage and vol-ppm is equal to molar parts per million.

Processes are disclosed herein for liquid phase reforming (LPR), with particular embodiments of the invention being directed to the reforming of one or more oxygenated C,H-containing compounds. The term "oxygenated C,H-containing compound" is meant to embrace compounds comprising carbon, hydrogen, and oxygen atoms, with a preference toward compounds made up exclusively of these atoms and no other types of atoms. Examples include alcohols (e.g., including polyols), ethers, ketones, aldehydes, carboxylic acids (e.g., including fatty acids), and carbohydrates (e.g., including hexose carbohydrates such as fructose and their oligomers such as sucrose). Particular compounds of interest are alcohols and ethers, specific examples of which are methanol, ethanol, and dimethyl ether. The oxygenated C,H-containing compound(s) may be derived from biological sources, such as in the case of being obtained from biomass pyrolysis or gasification, resulting in the generation of bio-based $H_2$ and $CO_2$ from LPR, having a reduced carbon footprint associated with their production compared to their petroleum-based counterpart products.

For convenience, the terms "reforming reactor/zone" and "post-reforming reactor/zone" are used to conveniently refer to "a reforming reactor or reforming zone" and "a post-reforming reactor or post-reforming zone," respectively. In view of the present disclosure, it can be appreciated that, according to particular embodiments of the invention, a "post-reforming zone" may be disposed downstream of a "reforming zone," within a single reforming/post-reforming vessel. The post-reforming zone may be a region within this vessel, in which the reforming of the oxygenated C,H-containing compound(s) introduced to the process, or introduced to the reforming zone, is substantially complete. For example, according to particular embodiments, at least about 80 wt-%, at least about 90 wt-%, at least about 95 wt-%, or at least about 99 wt-%, of the oxygenated C,H-containing compound(s) are converted in a reforming zone, upstream of a post-reforming zone. The post-reforming zone may alternatively, or in combination, be a region within this vessel, having a concentration of catalyst (e.g., a downstream concentration of catalyst), that is less than a concentration of catalyst (e.g., an upstream concentration of catalyst) in an upstream reforming zone. For example, catalyst may, in some cases, be substantially absent in the post-reforming zone (e.g., the concentration of catalyst in this zone may be less than about 1 wt-%, less than about 0.1 wt-%, or less than about 100 wt-ppm). Concentrations of catalyst in these zones may, more specifically, refer to concentrations of catalyst in the electrolyte solution present in these zones. A reduced concentration of catalyst, or the substantial absence of catalyst, may be achieved through the use of a partition dividing the upstream reforming zone from the downstream post-reforming zone, such as in the case of a porous material or filter that retains a heterogeneous (e.g., solid particulate) reforming catalyst substantially or completely within the upstream reforming zone. The post-reforming zone may alternatively, or in combination with any of the characteristics above, be a region within this vessel following a modification of the electrolyte solution to change solubility of a precipitated form of $CO_2$ or a captured form of $CO_2$, as described herein.

In view of the present disclosure, it can be likewise appreciated that, according to particular embodiments of the invention, a "post-reforming reactor" may be a separate vessel disposed downstream of a "reforming reactor," with the reforming reactor and post-reforming reactor having one or more of the respective characteristics of the reforming zone and post-reforming zone as described above, for example in terms of (i) conversion of the oxygenated C,H-containing compound(s) in the reforming zone being applicable to that in the reforming reactor, (ii) the reduced concentration of catalyst, or the substantial absence of catalyst, in the post-reforming zone being applicable to that in the post-reforming reactor, and/or (iii) the post-reforming zone containing electrolyte solution following a modification as described herein, being applicable to the post-reforming reactor containing electrolyte solution following a modification, e.g., following adding $CO_2$-precipitating cation, $CO_2$-capturing cation, and/or a pH-adjusting anion, between the reforming reactor and the post-reforming reactor.

An aqueous electrolyte solution or reaction medium, which is present in a reforming reactor/zone and/or a post-reforming reactor/zone as described herein, comprises electrolytes, including those formed of $CO_2$-precipitating cations, $CO_2$ capturing cations, and pH-adjusting anions as described herein. Such aqueous electrolyte solution or reaction medium may further comprise a catalyst that catalyzes the reforming of the oxygenated C,H-containing compound, although in certain embodiments, such catalyst may be present in the reforming reactor/zone and may be absent or substantially absent in the post-reforming reactor/zone, as described above. Representative electrolytes include hydroxides, carbonates, and/or bicarbonates, of alkali metals and/or alkaline earth metals. Particular metals of interest are selected from the group consisting of calcium, lithium, magnesium, barium, sodium, and potassium. The hydroxide, carbonate, and/or bicarbonate of ammonium ($NH_4^+$) may also be used as an electrolyte in the electrolyte solution or reaction medium. In representative embodiments, the total concentration of electrolytes in the electrolyte solution or reaction medium, which is present in a reforming reactor/zone and/or a post-reforming reactor/zone (e.g., at substantially the same concentration(s) in each reactor/zone) may be from about 0.5 normal (N) to about 12N, or in some cases the upper boundary of the concentration range may alternatively be the solubility limit(s) of the particular electrolyte(s)/salt(s) used. More typical ranges of the total concentration of electrolytes are from about 1N to about 8N, from about 2N to about 6N, or from about 2N to about 4N. Such ranges may otherwise apply to concentrations of individual $CO_2$-precipitating cations, $CO_2$ capturing cations, or pH-adjusting anions, as described herein. In certain embodiments, the concentration of any one, or at least one (e.g., two or more) of these cations or anions may be at least about 1N, at least about 3N, or at least about 5N.

In view of the possible reaction or consumption of any of $CO_2$-precipitating cations, $CO_2$ capturing cations, or pH-adjusting anions in processes described herein (e.g., the continuous use or consumption in a continuous process), a corresponding fresh or makeup source (e.g., provided as a continuous flow) may be needed, such as to replace an amount reacted or consumed. This may be, for example, an amount of $CO_2$-precipitating cations and/or $CO_2$-capturing cations having been reacted with $CO_2$ generated from reforming, to produce precipitated and/or captured forms of $CO_2$, respectively. In a similar manner, a fresh or makeup source of pH-adjusting anions may be used to restore a desired pH value. For example, such desired pH value may have been decreased due to the reaction of generated $CO_2$ to produce a precipitated form (e.g., reaction with $Ca(OH)_2$ to produce precipitated $CaCO_3$) or to produce a captured form (e.g., reaction with $CaCO_3$ to produce aqueous $CaHCO_3$). Any fresh or makeup source of $CO_2$-precipitating cations, $CO_2$ capturing cations, or pH-adjusting anions may be added directly to a reforming reactor/zone or a post-reforming reactor/zone, with addition to the former being preferred.

The fresh or makeup source may otherwise be added to a recycle stream to such reforming reactor/zone or a post-reforming reactor/zone, for example to a recycle stream containing the $CO_2$-precipitating cations, $CO_2$ capturing cations, and/or pH-adjusting anions as regenerated products.

Suitable catalysts for use in the electrolyte solution or reaction medium, and preferably in such solution or medium that is contained in a reforming reactor/zone, include those comprising one or more transition metals of Groups 8-10 Periodic Table (IUPAC) in elemental form, or otherwise as in the form of a compound, complex, or alloy. Representative catalysts may further comprise one or more metals, in any of the above forms, of Groups 7, 11, and 12. For example, a particular catalyst may comprise Pt, either alone or in combination with one or more of Cu, Zn, and/or Re. On a weight percentage basis in terms of the total weight of catalyst and electrolyte solution in the reforming reactor/zone, the catalyst metal(s) may be present in an amount, or combined amount, from about 0.05 wt-% to about 35 wt-%, such as from about 0.1 wt-% to about 30 wt-% or from about 1 wt-% to about 20 wt-%. For example, Pt and Ni may independently, or in combination, be present in an amount within these ranges. The catalyst may be homogeneous in the reforming reactor/zone, in which case the metal(s) may be in solution form, such as solubilized compounds or salts (e.g., nitrate salts). The catalyst may alternatively be heterogeneous, such as in the case of the metal(s) being supported on a solid carrier or support. The support may be conductive or non-conductive, with representative solid supports comprising metals or metal oxides, metal nitrides, metals carbides, or metal borides, or otherwise comprising carbon. Particular examples of solid supports include those comprising, or consisting of, silica, alumina, zirconia, titania, ceria, silicon carbide, silicon nitride, silicon boride, and mixtures thereof. In the case of solid supported catalysts, the catalytic metal(s) described above may represent from about 0.5 wt-% to about 50 wt-%, from about 1 wt-% to about 30 wt-%, or from about 2 wt-% to about 15 wt-% of the total catalyst weight (i.e., combined weight of the catalytic metal(s) and support). A heterogeneous catalyst may be used in reforming reactor/zone as a fixed bed or slurry bed, in which case the catalyst may be easily retained in this reactor/zone. For example, a reforming reactor/zone outlet screen or other partition, such as a bed of inert material (e.g., silica), which retains the solid catalyst but allows the electrolyte solution or reaction medium to pass into downstream operations (e.g., to a post-reforming reactor/zone, or otherwise directly to a solid-liquid separator and/or a regenerator), may effectively confine catalyst within a reforming reactor/zone. Solid supports for catalytic metal(s) may vary widely in terms of size and shape, and may include, for example, powders, spherical beads, cylindrical extrudates, and monoliths. In some embodiments, the catalytic metal(s) may be present preferentially or completely on an external surface of a support, such as in an external coating comprising the metal(s).

Representative processes comprise contacting the oxygenated C,H-containing compound with a catalyst in an aqueous electrolyte solution, or reaction medium. The aqueous electrolyte solution may comprise at least one $CO_2$-precipitating cation, or salt of such cation, having the ability to react with $CO_2$ that is generated from the reforming, to produce a precipitated (solid) form of the generated $CO_2$. For example, a precipitated carbonate form of $CO_2$ may be produced from the reaction of $CO_2$ with $Ca^{+2}$ as the $CO_2$-precipitating cation, such as in the case of this cation being initially present in the electrolyte solution as soluble calcium hydroxide at a pH of generally greater than about 12, and typically greater than about 14. Such pH values may be representative of the electrolyte solution or reaction medium, as present in a reforming reactor/zone and/or a post-reforming reactor/zone, as described herein. At such strongly alkaline pH values, representative $CO_2$-precipitating cations include $Ca^{+2}$, $Li^+$, $Mg^{+2}$, $Sr^{+2}$, and $Ba^{+2}$, and these may be added to the aqueous electrolyte solution or reaction medium (e.g., to continuously react with $CO_2$ generated from reforming to produce a precipitated (solid) form of $CO_2$) as their respective hydroxide salts, namely $Ca(OH)_2$, $LiOH$, $Mg(OH)_2$, $Sr(OH)_2$, and/or $Ba(OH)_2$. According to particular embodiments, at least one of such $CO_2$-precipitating cations may be added to this solution or medium in a post-reforming reactor/zone as described herein, positioned downstream of a respective reforming reactor/zone.

Alternatively, or in combination, the aqueous electrolyte solution may comprise at least one $CO_2$-capturing cation, or salt of such cation, having the ability to react with $CO_2$ that is generated from the reforming, to produce a captured (aqueous or solubilized) form of the generated $CO_2$. For example, a captured bicarbonate form of $CO_2$ may be produced from the reaction of $CO_2$ with $Ca^{+2}$ as the $CO_2$-capturing cation, such as in the case of this cation being initially present in the electrolyte solution as soluble calcium bicarbonate at a pH generally from about 8 to about 12, and typically from about 10 to about 12. Such pH values may be representative of the electrolyte solution or reaction medium, as present in a reforming reactor/zone and/or a post-reforming reactor/zone, as described herein. At such moderately to strongly alkaline pH values, representative $CO_2$-capturing cations include $Ca^{+2}$, $Li^+$, $Mg^{+2}$, $Sr^{+2}$, and $Ba^{+2}$, and these may be added to the aqueous electrolyte solution or reaction medium (e.g., to continuously react with $CO_2$ generated from reforming to produce a captured (solubilized) form of $CO_2$) as their respective carbonate salts. Other $CO_2$-capturing cations, which can likewise promote the solubilization of precipitated forms of generated $CO_2$, include $Na^+$, $K^+$, and $NH_4^+$, which may be added in any of their respective soluble hydroxide, carbonate, or bicarbonate forms. According to particular embodiments, at least one of such $CO_2$-capturing cations may be added to this solution or medium in a post-reforming reactor/zone as described herein, positioned downstream of a respective reforming reactor/zone.

Regardless of whether $CO_2$ generated from LPR manifests as precipitated (e.g., carbonate) form or a captured (e.g., bicarbonate), this $CO_2$ may be effectively prevented from combining with the gas phase $H_2$ that is removed from the LPR reactor or zone, thereby leading to a high purity product. For example, depending on the particular reforming conditions (within the reforming reactor or zone) used, the hydrogen product may have a purity of greater than about 90 vol-%, greater than about 95 vol-%, greater than about 99 vol-%, greater than about 99.9 vol-%, greater than about 99.95 vol-%, or greater than about 99.99 vol-%. The concentration of $CO_2$ in the hydrogen product, or otherwise the combined concentration of $CO_2$ and $CO$, may be less than about 5 vol-%, less than about 1 vol-%, less than about 1000 vol-ppm, less than about 100 vol-ppm, less than about 10 vol-ppm, or less than about 1 vol-ppm. Generally, more severe conditions in the reforming reactor or zone, in terms of total pressure and pH of the electrolyte solution, can lead to a higher purity of the hydrogen product. Representative absolute pressures in the reforming reactor or zone are from about atmospheric pressure (about 0.1 MPa) to about 70 MPa. For example, high pressure operation may include pressures in this reactor or zone from about 10 MPa to about 70 MPa or from about 20 MPa to about 70 MPa. Lower pressure operation may include pressures in this reactor or zone from about atmospheric pressure to about 10 MPa, from about atmospheric pressure to about 5 MPa, or from about atmospheric pressure to about 1 MPa. These ranges of pressure in the reforming reactor or zone may correspond to pressures at which the $H_2$ product (e.g., a stream $H_2$ having a purity as described above) is obtained, for example removed in the gas phase from this reactor or zone. Directionally, the purity of the $H_2$ product is increased also with increasing pH of the electrolyte or reaction medium used in this reactor or zone. For example, the high purities described above may be obtained at a pH of greater than about 12, greater than about 14, or even greater than about 15, whereby such high pH values can more readily lead to the formation of a precipitated or solid carbonate form of $CO_2$ generated from reforming, which can be easily separated from the generated $H_2$. In the case of LPR processes that result in the generation of $H_2$ having high purity (e.g., greater than about 99.99 vol-%) and limited $CO_2$ and/or $CO$ contamination as described above (e.g., less than about 1 vol-ppm), these properties can allow for the direct usage of the $H_2$ product for fuel cell applications, with little or no treatment to improve the quality of this product.

The operation of the LPR process to produce a precipitated (solid) form of the generated $CO_2$, a captured (solubilized) form, or a combination of these forms, has implications for downstream processing, for example with respect to the manner in which salts utilized in the electrolyte solution or reaction medium may be regenerated. In this regard, representative LPR processes may comprise modifying, in a post-reforming reactor or post-reforming zone, positioned downstream of the respective reforming reactor or zone, a condition of the electrolyte solution to change the solubility of a given form of the generated $CO_2$, such as the solubility of a precipitated solid (e.g., carbonate) form or the solubility of a captured aqueous (e.g., bicarbonate) form of the generated $CO_2$. This step of modifying, in turn, influences the extent (if any) to which a step of solid-liquid separation should be utilized for separating precipitated (solid) forms of $CO_2$, such as a carbonate form, from captured (aqueous) forms of $CO_2$, such as a bicarbonate form. Following any solid-liquid separation, regeneration of electrolyte salts can proceed according to different treatments of the separated, solid and liquid phases. From the present disclosure, it can be appreciated that a given cation can serve as a $CO_2$-precipitating cation as well as a $CO_2$-capturing cation, depending, for example, on the pH of the electrolyte solution. In this case, the step of modifying a condition of the electrolyte solution, downstream of the reforming reactor or zone, may comprise adjusting the pH of this solution to convert some or all of one form of generated $CO_2$, partially or completely to another form. For example, modifying may comprise converting at least a portion of the captured bicarbonate form of generated $CO_2$ to the precipitated carbonate form of generated $CO_2$, such as by increasing the pH of the electrolyte solution in the post-reforming reactor or zone, relative to that in the reforming reactor or zone. Conversely, modifying may comprise converting at least a portion of the precipitated carbonate form of generated $CO_2$ to the captured bicarbonate form of generated $CO_2$, such as by decreasing the pH of the electrolyte solution in the post-reforming reactor or zone, relative to that in the reforming reactor or zone.

In terms of operation by obtaining one or more precipitated forms of $CO_2$, as opposed to one or more captured forms, precipitation is generally favored at high pH values and results in reduced losses of hydrogen being dissolved in the electrolyte solution. In this regard, the operation of the LPR can be tailored to achieve specific objectives in terms of balancing solution losses of hydrogen with increased purity of the hydrogen product, both of which increase directionally with increasing operating pressure. The equipment costs of higher operating pressures can also be weighed against the need for post-compression of the hydrogen product, if necessary, to meet a given application (e.g., fuel cell vehicle (FCV) fueling). In some embodiments, operation by obtaining precipitated (e.g., carbonate) form(s) of $CO_2$ can be sustained with no net water consumption. For example, the use of methanol as a feedstock with hydroxides in the electrolyte solution does not directly result in water consumption, and this may be important for locations having a limited clean water supply. The use of methanol as a feedstock in combination with obtaining one or more captured (e.g., bicarbonate) forms of $CO_2$ can likewise result in a high-purity, low $CO_2/CO$-containing hydrogen product that is commensurate with fuel cell applications, but may differ in that water consumption is increased, for example due to the requirements of the carbonate regenerator.

Aspects of the invention therefore relate to the exploitation of properties of particular cations, in terms of their ability to precipitate, or physically sequester, $CO_2$ under conditions of relatively high pH, as well solubilize, or capture, $CO_2$ under conditions of relatively lower pH. A particular cation of interest, which can serve as a $CO_2$-precipitating cation or a $CO_2$-capturing cation, is $Ca^{+2}$, which in aqueous media is soluble in its hydroxide and bicarbonate forms, but essentially insoluble in its carbonate form. The selection and manipulation of pH within the reforming and/or post-reforming stages of the process, whether within a single reactor vessel or separate vessels, allows these forms to be interchanged in a manner to improve control of the reforming reaction as well as downstream processing and electrolyte regeneration. For example, methanol as a representative oxygenated C,H-containing compound may undergo reforming in an aqueous, liquid phase environment in a calcium hydroxide-containing electrolyte solution to produce $H_2$ and calcium bicarbonate as particular, captured (aqueous or solubilized) bicarbonate form of $CO_2$ that is also generated from this reforming, according to the reaction:

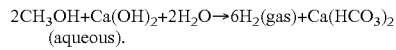
(aqueous).

In such embodiment, $CO_2$ generated from reforming may be effectively solubilized in the reforming reactor or zone, which can advantageously facilitate phase separability from a heterogeneous catalyst, if present in such reactor or zone. In any event, modifying the electrolyte solution downstream of the reforming reaction, such as by adding a pH-adjusting anion, may convert the captured (aqueous) bicarbonate form of $CO_2$ to the precipitated or sequestered (solid) form of $CO_2$. For example, a specific embodiment may comprise adding the hydroxide anion as calcium hydroxide in a further amount, beyond that added to the upstream reforming reactor zone, promoting the following reaction:

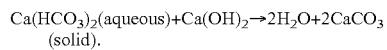
(solid).

The cation $Ca^{+2}$ is therefore exemplary in terms of its use in manipulating $CO_2$ generated from LPR, by maintaining this reaction product in various forms and/or converting it from one form to another. Such manipulation advantageously allows for the generated $CO_2$ to be ultimately sequestered as a solid product, such as $CaCO_3$, or possibly CaO following a further heat treatment (e.g., calcination), or otherwise allows for recovering the generated $CO_2$ at various stages of the process, such as preferably during regeneration of salts used in the electrolyte solution. Other cations can likewise possess characteristics of both a $CO_2$-precipitating cation and a $CO_2$-capturing cation, depending on pH and other conditions of the aqueous electrolyte solution, either in a reforming reactor/zone or in a post-reforming reactor/zone. This is due to the various salts of such cations (e.g., their hydroxide, carbonate, and bicarbonate salts) exhibiting differences in solubility under such conditions. For example, $Li^+$, $Mg^{+2}$, $Sr^{+2}$, and $Ba^{+2}$ can serve in a manner analogous to that of $Ca^{+2}$, described above, in terms of their ability to precipitate as a solid (e.g., a carbonate form) and/or capture as an aqueous salt (e.g., a bicarbonate form), forms of $CO_2$ that react with these cations in the aqueous electrolyte solution. The pH of the aqueous electrolyte solution will generally impact the apportioning of a given cation among its hydroxide, carbonate, and bicarbonate salts. For example, pH can provide a gauge of the carbonate/bicarbonate molar ratio for a given solution.

Accordingly, representative cations that may, depending on conditions of the aqueous electrolyte solution, be $CO_2$-precipitating cations that can produce a solid (e.g., carbonate) form of $CO_2$, or otherwise may be $CO_2$-capturing cations that can produce an aqueous (e.g., bicarbonate) form of $CO_2$, are selected from the group consisting of $Ca^{+2}$, $Li^+$, $Mg^{+2}$, $Sr^{+2}$, and $Ba^{+2}$ and combinations thereof. The use of such cation(s) for precipitation (formation of solid particles) may be associated with their introduction and/or their recycling to either a reforming reactor/zone or a post-reforming reactor/zone in its/their respective hydroxide form, causing precipitation of a solid, carbonate form $CO_2$. In this case, the pH of the aqueous electrolyte solution in the reforming reactor/zone and/or post-reforming reactor/zone may be strongly alkaline, for example >12, or >14, depending on the particular $CO_2$-precipitating cation(s). Alternatively, the use of such cation(s) for capture (solubilization) may be associated with their introduction and/or their recycling to either a reforming reactor/zone or a post-reforming reactor/zone in its/their respective carbonate form, causing solubilization of an aqueous, bicarbonate form $CO_2$. In this case, the pH of the aqueous electrolyte solution in the reforming reactor/zone and/or post-reforming reactor/zone may be moderately to strongly alkaline, for example in the range from about 8 to about 12, or from about 10 to about 12, depending on the particular $CO_2$-capturing cation(s).

Accordingly, depending on the pH and other conditions of the electrolyte solution (e.g., the presence of other cations such as $Na^+$, $K^+$ and/or $NH_4^+$), cations for precipitating a form of $CO_2$ ($CO_2$-precipitating cations) or otherwise for capturing or solubilizing a form of $CO_2$ ($CO_2$-capturing cation) may be used in modifying the electrolyte solution or reaction medium. For example, this solution or medium may be modified in the reforming reactor/zone, or otherwise the post-reforming reactor/zone, to change the solubility of one or both of these forms, such as in the case of converting at least a portion of a captured (solubilized) bicarbonate form of generated $CO_2$ to a precipitated (solid) carbonate form. Such a modifying step may include adding (e.g., by recycling), to the reforming reactor/zone, or otherwise to the post-reforming reactor/zone, an amount of at least one $CO_2$-precipitating cation, which may represent a further amount in addition to that added in a fresh or makeup amount. In this case, the $CO_2$-precipitating cation may be selected from the group consisting of $Ca^{+2}$, $Li^+$, $Mg^{+2}$, $Sr^{+2}$, and $Ba^{+2}$ and may be added as a hydroxide salt (e.g., in an aqueous solution), namely as $Ca(OH)_2$, $LiOH$, $Mg(OH)_2$, $Sr(OH)_2$, and/or $Ba(OH)_2$, to provide a strongly alkaline electrolyte solution or reaction medium, for example having a pH of >12, or a pH of >14.

In changing solubility of the precipitated (solid) or captured (solubilized) forms of $CO_2$, the electrolyte solution or reaction medium may be modified in the reforming reactor/zone, or otherwise the post-reforming reactor/zone, to convert at least a portion of a precipitated (solid) carbonate form of generated $CO_2$ to a captured (solubilized) bicarbonate form. Such a modifying step may include adding (e.g., by recycling), to the reforming reactor/zone, or otherwise to the post-reforming reactor/zone, an amount of at least one $CO_2$-capturing cation, which may represent a further amount in addition to that added in a fresh or makeup amount. In this case, the $CO_2$-capturing cation may act as a solubilizing cation, may be selected from the group consisting of $Ca^{+2}$, $Li^+$, $Mg^{+2}$, $Sr^{+2}$, and $Ba^{+2}$, and may be added as a carbonate salt (e.g., in an aqueous solution), to provide a moderately to strongly alkaline electrolyte solution or reaction medium, for example having a pH in the range from about 8 to about 12, or from about 10 to about 12.

Other $CO_2$-capturing cations that may be more effective as solubilizing cations, such as in capturing generated $CO_2$ and producing a captured bicarbonate form, include $Na^+$, $K^+$, and $NH_4^+$. These cations may therefore be added in a step of modifying as described above, for example to convert a solid form of generated $CO_2$ to a solubilized form. These cations may be added in any suitable form, including their soluble hydroxide, carbonate, and bicarbonate forms, depending on the desired pH of the electrolyte solution or reaction medium. The step of modifying may alternatively involve adding a pH-adjusting anion of any salt, such as a hydroxide ion to increase pH or a carbonate or a bicarbonate ion to decrease pH, with the pH-adjusting anion addition possibly occurring simultaneously with the $CO_2$-precipitating cation addition or $CO_2$-capturing cation addition. In the case of adding, to a post-reforming reactor or post-reforming zone, a $CO_2$-precipitating cation, a $CO_2$-capturing cation, or a pH-adjusting anion, the concentration of such added cation or anion will generally be increased, relative to its concentration in the upstream reforming reactor or reforming zone. Preferred pH-adjusting anions are hydroxides of $Na^+$, $K^+$, and $NH_4^+$, namely $NaOH$, $KOH$, and $NH_4OH$.

According to some embodiments, the precipitation and/or capture of $CO_2$ may represent an initial step in regenerating salts of $CO_2$-precipitating cations and/or $CO_2$-capturing cations, for introduction back into either a reforming reactor/zone or a post-reforming reactor/zone. The regeneration may advantageously be carried out in conjunction with recovering (liberating) $CO_2$ generated from reforming, such as in the recovery of $CO_2$ from its precipitated form and/or the recovery of $CO_2$ from its captured form. In this manner, high purity $CO_2$, separate from the $H_2$ produced by LPR, may be recovered as a product that beneficially impacts the overall process economics. In this case, the "separate" product has the significance that is it not obtained from a gas phase separation of the $H_2$ product, such as a separation utilizing a membrane or adsorbent (e.g., in the case of pressure-swing adsorption, or PSA).

FIG. 1 depicts a flowscheme that illustrates a representative liquid phase reforming (LPR) process, with options for recovering the generated $CO_2$. Whereas this figure illustrates a combination of operations that include solid-liquid separation and/or the processing of different portions of the effluent from a post-reforming reactor/zone, such combination is presented in FIG. 1 as a matter of convenience, as those skilled in the art will recognize from the present disclosure as a whole that disclosed processes for LPR include subsets of these operations, i.e., they do not require all illustrated operations, although in some embodiments all illustrated operations will be advantageous. The use of dashed lines in FIG. 1 is meant to highlight certain operations that may be optional. As illustrated in FIG. 1, feeds or inputs to reforming reactor/zone 15 include input oxygenated C,H-containing compound 10, such as a feed stream comprising methanol and/or ethanol, and input water 12, such as a feed stream comprising an aqueous electrolyte solution as described herein. In the case of using an alcohol feed, this provides for efficient mixing with water and electrolyte solution such as an alkaline solution comprising hydroxide ions (e.g., an electrolyte solution comprising $Ca(OH)_2$), and, accordingly, inputs 10, 12 may be provided to reforming reactor/zone 15 as a single stream. This mixing may also serve to minimize mass transport to active catalyst sites, such as sites of catalyst metals described herein. In some embodiments, separate makeup reforming electrolyte solution 14a may be added to reforming reactor/zone 15 as a source of desired $CO_2$-precipitating cations and/or $CO_2$-capturing cations, to replace amounts consumed by reaction. In certain embodiments, an input to the reforming reactor/zone 15 is an oxygenated hydrocarbon (e.g., methanol, ethanol, or dimethyl ether) that is miscible with water, together with water that is present in a bicarbonate solution, at least during an initial startup period (e.g., prior to steady-state operation). Outputs can include an $H_2$ product stream, having a purity and being recovered at a pressure as described herein, with purity being dependent on the particular feed, catalyst, and operating conditions, including reforming temperature, pressure, and concentration(s) of anions and cations used in the electrolyte solution or reaction medium.

Reforming under conditions described herein produces $H_2$ product 150, which can be removed at high purity and with little or essentially no contaminant $CO_2$ and/or CO. This $H_2$ product 150 may be withdrawn, for example, from vapor space (reactor headspace) 1500 in reforming reactor/zone 15, as a separate phase above liquid phase 1501 comprising the reaction medium, in which the catalyst may be contained. In general, but particularly in embodiments in which a heterogeneous (solid) catalyst is used in reforming reactor/zone 15, the formation of a precipitated (e.g., carbonate) form of $CO_2$ generated from reforming is avoided in this reactor/zone. That is, preferably any solids in the electrolyte solution in reforming reactor/zone 15 are solid catalyst particles, and solids formed as reaction products are absent or substantially absent. This promotes the effective separation of catalyst in reforming reactor/zone 15 from reaction products that may be beneficially further processed as described herein. Optionally, $H_2$ product 150 may be further purified, if necessary, using techniques such as membrane purification or pressure swing adsorption (PSA).

The electrolyte solution that is used in reforming reactor/zone 15 may subsequently pass to post-reforming reactor/zone 25, which may be distinguishable according to one or more characteristics described herein, such as lacking catalyst and/or being modified by the addition of cations and/or anions that influence solubility and/or pH. According to the embodiment of FIG. 1, post-reforming reactor/zone 25 is demarcated by the addition of one or more regenerated products 42 that are recycled to this reactor/zone, as well as optionally separate makeup post-reforming electrolyte solution 14b, which can additionally serve the purpose of makeup reforming electrolyte solution 14a, i.e., to replace cations consumed by reaction. In particular embodiments, hydroxide ions, for example as NaOH or KOH, may be introduced to reforming reactor/zone 15 in makeup reforming electrolyte solution 14a and/or introduced to post-reforming reactor/zone 25 in makeup post-reforming electrolyte solution 14b. Alternatively, or in conjunction, carbonate ions may be introduced to reforming reactor/zone 15 and/or post-reforming reactor/zone 25 in one or more regenerated products 42, for example obtained from carbonate regenerator 65. The various ions, prior to introduction to the process, such as to reforming reactor/zone 15 and/or post-reforming reactor/zone 25, may be mixed together or maintained separate, with either approach being tailored to obtain an $H_2$ product at a desired pressure and purity. For example, contaminant levels of $CO_2$ and/or CO, which are of concern for fuel cell applications, may be mitigated to a combined concentration of less than 1 vol-ppm to allow direct utilization of this hydrogen in a fuel cell with no supplemental processing (purification) of the $H_2$ product.

Representative processes may comprise withdrawing, from post-reforming reactor/zone 25, post-reforming effluent 16, having precipitated (solid) and/or captured (aqueous, solubilized) forms of $CO_2$ that is generated from reforming, as described herein. Depending on the particular forms present, post-reforming effluent 16 may be further processed, according to different options for the recovery of $CO_2$ and regeneration of desired components of the electrolyte solution. For example, in the case of post-reforming effluent 16 comprising a precipitated form of $CO_2$ (e.g., $CaCO_3$ as solid particles or crystals), a first portion, such as separator feed portion 18 of this effluent, may be fed or provided to solid-liquid separator 35, such as a filtration unit or centrifugal separation device. A solid retentate 28, enriched in the precipitated form of $CO_2$ and recovered from solid-liquid separator 35, may then be processed by recovering the generated $CO_2$, namely the $CO_2$ that is generated from reforming and present in a precipitated form in the post-reforming effluent 16. Carbonates, such as those of $Ca^{+2}$, $Li^+$, $Mg^{+2}$, $Sr^{+2}$, and $Ba^{+2}$, and preferably $CaCO_3$ or $Li(CO_3)_2$, which may be formed in the process, can be recovered at high purity (e.g., a purity of at least about 99 wt-%, at least about 99.9 wt-%, at least about 99.99 wt-%, or at least about 99.999%), such as in solid retentate 28, optionally by using additional purification steps (e.g., drying). In addition, various carbonates can be produced by varying the cations in the process, such that these carbonate products can contribute to the overall economic attractiveness. In this regard, operation of the reforming reactor/zone under strongly alkaline conditions (e.g., at a pH of 15 or higher), can directionally favor increasing purity for both the generated $H_2$ and carbonate products. In the further processing of solid retentate 28, the recovering of $CO_2$ may comprise, for example, heating the precipitated form (e.g., carbonate form) that is recovered in this product, and obtaining an oxide form of the $CO_2$-precipitating cation. Like the precipitated form of $CO_2$, the oxide form may also be a solid form.

According to the particular embodiment illustrated in FIG. 1, solid retentate 28 is transferred (e.g., as a solid or possibly as a slurry in a liquid carrier such as a portion of the electrolyte solution) to calciner 45, to which heat 29 is input to recover $CO_2$ generated from reforming, as calciner $CO_2$ product 30. The oxide from of the $CO_2$-precipitating cation may therefore be calciner oxidized product (e.g., calcined CaO) 32, which is obtained from calciner 45 in conjunction with calciner $CO_2$ product 30. Representative processes may further comprise hydrolyzing the oxide form of the $CO_2$-precipitating cation to obtain, or regenerate, a hydroxide form of this cation. For example, as further illustrated, calciner oxidized product 32 is transferred (e.g., as a solid or possibly as a slurry in a liquid carrier such as a portion of the electrolyte solution) to slaker 55, to which at least a portion, such as first portion 24 of aqueous filtrate 22 obtained from solid-liquid separator 35, may be added. This produces slaker product (e.g., $Ca(OH)_2$) 34, for example as a hydrolyzed, regenerated product and particular hydroxide form of the $CO_2$-precipitating cation. To minimize the carbon footprint associated with particular LPR processes, calciner 45 may operate as an indirect calciner, being driven electrically or by the combustion of hydrogen to avoid direct $CO_2$ emissions. In one embodiment, heat may be recovered from slaker 55, which operates exothermically, and utilized elsewhere in the process, such as to supply reaction heat reforming reactor/zone 15. Such heat integration strategies can further reduce overall energy requirements and the associated environmental impacts.

Representative processes may comprise adding the hydroxide form of the $CO_2$-precipitating cation, such as $Ca(OH)_2$ or other hydroxide form (e.g., LiOH) obtained in an analogous manner, to the electrolyte solution, such as to the reforming reactor/zone 15 or post-reforming reactor/zone 25. According to the illustrated embodiment, slaker product (e.g., $Ca(OH)_2$) 34 is recycled to post-reforming reactor/zone 25, optionally after being combined with carbonate product 40, which may also be a regenerated product, and/or makeup post-reforming electrolyte solution 14b. In the case of aqueous filtrate 22 comprising a captured form of $CO_2$ (e.g., solubilized $Ca(HCO_3)_2$), at least a portion, such as second portion 26 of aqueous filtrate 22, may be fed to regenerator 65 for recovery of $CO_2$ from this captured form. Optionally, all of aqueous filtrate 22 may be fed to regenerator 65, or, according to other processing alternatives, all or a portion of aqueous filtrate 22 may be recycled to reforming reactor/zone 15 or post-reforming reactor/zone 25, in order to effectively utilize components (cations/anions) present in this filtrate, for precipitation, solubilization, and/or pH adjustment.

In the case of post-reforming effluent 16 comprising a captured form of $CO_2$ (e.g., solubilized $NaHCO_3$), this may warrant the use of other techniques for the recovery of $CO_2$ generated from reforming, which is present in this form. For example, if no precipitated solids are present in post-reforming effluent 16, this effluent may be processed in its entirety in carbonate regenerator 65, whereas if some precipitated solids are present, only separator bypassing portion 20 may be fed to this regenerator. Operation without precipitated solids can result from the selection of cations such as $Na^+$, $K^{+r}$, and $NH_4^+$ that maintain captured forms of $CO_2$, which may be carbonate forms of these cations, in solution. In this regard, generally $Na^+$ cations are more effective in promoting solubilization compared to $K^+$ cations, although a mixture of cations may be used. In any event, separator bypassing portion 20 may represent a second portion of post-reformingeffluent 16, with the first portion being separator feed portion 18, as described above. In the embodiment illustrated in FIG. 1, either or both of separator bypassing portion 20 of post-reforming effluent and/or second portion 26 of aqueous filtrate 22 may comprise $CO_2$ that is captured or solubilized in its bicarbonate form. The conversion of bicarbonate anion, present in either or both of 20, 26, to carbonate anion in regenerator 65 may therefore be used to (i) regenerate carbonate anions for use (or re-use) in the electrolyte solution, and also (ii) recover $CO_2$ that is initially present in post-reforming effluent 16 in its captured or solublized form. In the case of post-reforming effluent 16 comprising sodium bicarbonate as a captured form of $CO_2$, for example, this may be converted to sodium carbonate according to the reaction:

$$2NaHCO_3 \rightarrow Na_2CO_3 + CO_2 + H_2O.$$

In addition to either or both of separator bypassing portion 20 of post-reforming effluent 16 and/or second portion 26 of aqueous filtrate 22, another feed to carbonate regenerator 65 is steam 36. In a preferred configuration, one or both of 20, 26 is passed downwardly against counter-flowing, or rising, steam 36, to recover regenerator $CO_2$ product 38 from solubilized or captured forms of $CO_2$ initially present in post-reforming effluent 16. Also obtained is carbonate product 40, comprising carbonate anions, for example as a regenerated aqueous product that is useful for recycle to reforming reactor/zone 15 and/or post-reforming reactor/zone 25, as a component of one or more regenerated products 42. Typically, carbonate regenerator 65 operates at an absolute pressure from about atmospheric pressure (about 100 kPa) to about 300 kPa.

Accordingly, in particular embodiments, representative processes comprise withdrawing, from the post-reforming reactor or post-reforming zone 25, a post-reforming effluent 16. A least a portion of this effluent may be fed to a solid-liquid separator 35 to separate or recover (i) at least a portion of the precipitated (e.g., carbonate) form of generated $CO_2$ and (ii) at least a portion of the captured (e.g., bicarbonate) form of generated $CO_2$. The components (i) and (ii) may therefore be initially present in the post-reforming effluent. Component (i) may be obtained as a solid retentate 28 of solid-liquid separator 35, but may be obtained as slurry or formed into such slurry, such as by adding an aqueous carrier, to facilitate transport. Component (ii) may be obtained in an aqueous filtrate 22, and, in this case, representative processes may further comprise recovering the generated $CO_2$ by contacting at least a portion of the aqueous filtrate 22 with steam 36 in a carbonate regenerator 65 and obtaining a carbonate form (e.g., solubilized form) of the $CO_2$-capturing cation, such as in carbonate product 40.

Figure 2:
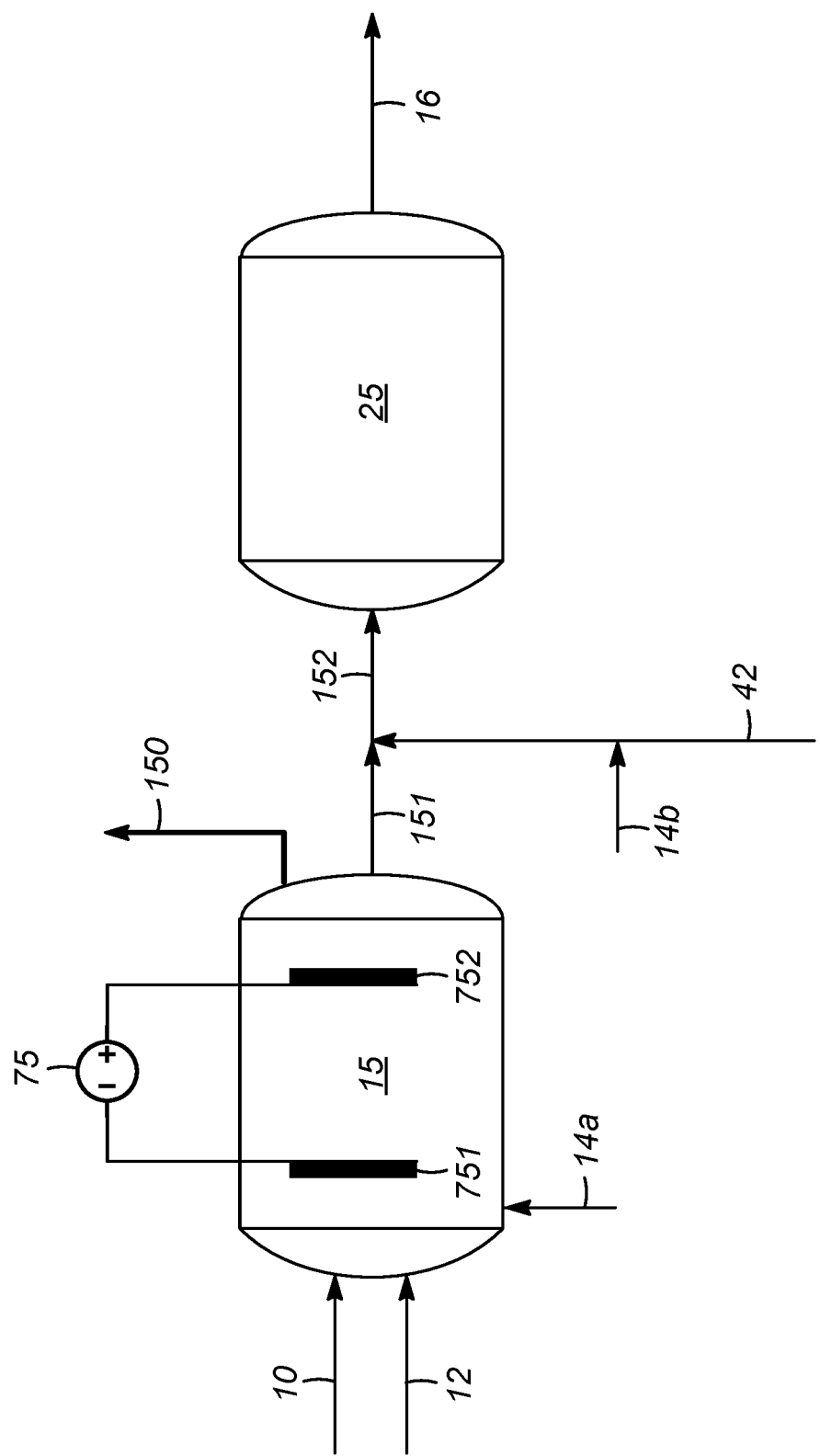
FIG. 2 depicts, more particularly, a reforming reactor of liquid phase reforming (LPR) process that contains an electrochemical cell, with the reforming reactor being a separate vessel from a post-reforming reactor.

FIG. 2 depicts a particular reforming reactor 15 and other features that may be incorporated in a liquid phase reforming (LPR) process described herein. As illustrated in this embodiment, reforming reactor 15 is a vessel that is separate from that of post-reforming reactor 25. Between these separate vessels 15, 25, one or more regenerated products 42 and/or makeup post-reforming electrolyte solution 14b may be added, for modifying a condition in post-reforming reactor 25, as described herein, to change the solubility of a precipitated (solid) from of generated $CO_2$ and/or a captured (aqueous or solubilized) form of generated $CO_2$. According to the embodiment of FIG. 2, such components may be added, more specifically, to reforming reactor effluent 151, to provide post-reforming reactor feed 152. In the same or in an analogous manner as illustrated with respect to the embodiment of FIG. 1, a further amount of at least one $CO_2$-precipitating cation, a further amount of at least one $CO_2$-capturing cation (e.g., acting as a solubilizing cation), and/or a pH-adjusting anion, may be added to post-reforming reactor 25, such that concentration(s) of any of these cations/anions may be increased, relative to those in reforming reactor 15.

As also illustrated in the embodiment of FIG. 2, reforming reactor 15 may contain electrochemical cell 75 having anode 751 and cathode 752. In utilizing electrochemical cell, representative process may further comprise applying a voltage between the anode and the cathode to cause electrically-driven reforming of input oxygenated C,H-containing compound 10 by reaction with input water 12 in the aqueous electrolyte solution or reaction medium. This produces $H_2$ and one or both of the precipitated and/or captured forms of $CO_2$ that is generated as a co-product of LPR, as described herein. Advantageously, with the use of electrochemical cell 75, the electrically-driven reforming can be carried out in combination with thermally-driven reforming, with this combination utilizing both electric and heat inputs to expand the range of operating modes and associated conditions. For example, with electrically-driven reforming, the reactions at the anode and cathode that in combination lead to conversion of the oxygenated C,H-containing compound to $H_2$ and $CO_2$, can be performed under ambient or even sub-ambient temperatures, such as in the case of the average temperature of the electrolyte solution being less than about 20° C. Whether or not downstream processing involves the treatment of cations/anions as solid precipitates or salt solutions, or involves regeneration and $CO_2$ recovery, according to embodiments described above, the use of electrochemical cell 75 to introduce electrons to catalyst sites can beneficially impact reaction pathways. In view of the present disclosure, it can be appreciated that tradeoffs between conditions of electric potential, temperature, and pressure can result in different productivities of non-$H_2$ molecules (e.g., light $C_1$-$C_3$ hydrocarbons), which can manifest in the $H_2$ product of the reforming reactor/zone. $H_2$ purity can be controlled using the electrical potential as one process parameter, to provide desired properties in terms of product purity at a given pressure, which purity/pressure profile will also be dependent on the specific feed, such as methanol versus ethanol.

Although not shown in the particular embodiments of FIGS. 1 and 2, representative LPR processes may be further integrated with applications that demand hydrogen having purity levels described above (e.g., at least about 90 vol-%), such as refinery or fuel cell applications. Refineries, for example, generally have limited space for additional processing equipment, and, in this regard, a source of refinery ethanol may be available, or made available, from the conversion of ethane recovered from light ends to ethanol. Depending on overall economics and environmental impact, however, importation of ethanol and/or methanol may be another option. The reforming of one or both of these alcohols as exemplary feeds for LPR can provide hydrogen-rich gas useful for a number of hydroprocessing operations typically conducted in a refinery, such as hydrodesulfurization and/or hydrodenitrification (e.g., of diesel boiling range hydrocarbons), hydrocracking (e.g., of higher molecular weight hydrocarbon fractions such as vacuum gas oil), hydroisomerization (e.g., of straight-chain hydrocarbons), etc. The wide scope of operating pressures suitable for LPR allow for the supplied hydrogen to be provided/made available over a similarly broad range of pressures (e.g., from 2.5 MPa to 25 MPa) that can be matched with a particular refinery unit operation (e.g., a hydroprocessing unit). In view of the hydrogen generation being carried out in the liquid phase, the system pressure may be governed all or at least in part by pumps, such as those supplying the liquid feed(s), as opposed to compressors.

In certain embodiments, therefore, hydrogen may be transferred, or more generally may be supplied, without downstream compression or additional purification, beyond that obtained by direct removal from the reforming reactor/zone (e.g., from a gas headspace in this reactor/zone). In the particular case of integrating LPR with refinery operations, further opportunities exist with respect to the utilization of refinery waste heat, such as in the generation of steam for a carbonate regenerator, as described above. Even low-grade waste heat, which may otherwise have little or no value, can be used in the reforming reactor/zone of LPR, according to embodiments in which the reaction is conducted at low temperatures (e.g., 200° C. or less). As described above, a further "handle" for such low temperature operation resides in the ability, as a supplemental measure, to drive the reforming reaction electrically. Operational control can be improved to the extent of enabling almost instantaneous shutdown, simply by cutting power. In the case of integration with refinery applications that require significant $H_2$ consumption, a representative LPR process may be sized to deliver high-purity hydrogen at a capacity of 5,000 $NM^3$/hr or more, and preferably 10,000 $NM^3$/hr or more.

Processes for performing LPR as described herein may also be conducted conveniently at fuel cell vehicle (FCV) fueling stations to provide high-purity, high pressure (e.g., 75 MPa or higher) hydrogen. Carbon from the generated $CO_2$ may be sequestered or captured on-site, according to processes described herein. Advantageously, in view of the high purity of $CO_2$ that may be recovered by regeneration of either the $CO_2$-precipitating cations or the $CO_2$-capturing cations, as described herein, a product of LPR, in addition to the generated $H_2$, may be food grade $CO_2$. This may be obtained, for example, as a pressurized liquid for ease of transport (e.g., to a location off-site of that of an FCV fueling station). Alternatively, or in combination, one or more solid carbonates (e.g., $CaCO_3$ and/or $Li_2CO_3$) may also be obtained as a product and transported (e.g., trucked) to a suitable location for the use of this valuable product.

The integration of LPR processes described herein, according to which generated $CO_2$ may be sequestered (precipitated) or captured (solubilized), with FCV fueling stations has significant advantages if methanol is used as a feedstock. Experimental data indicated that, using this feedstock in operations that utilize the precipitation of generated $CO_2$, the purity of the hydrogen product can meet or exceed 99.95 vol-%, as obtained directly from the reforming reactor. In addition, the $CO_2$ and CO concentrations in this product were less than 10 vol-ppm and less than 1 vol-ppm, respectively. Therefore, LPR processes described herein can interface directly with fuel cell applications and systems, without a requirement for supplemental purification of the hydrogen product.

Overall, aspects of the invention relate to the discovery of various strategies for managing byproduct $CO_2$ in the liquid phase reforming (LPR) of oxygenated C,H-containing compounds, such as alcohols. Important processing options include those in which electrolyte, consumed in capturing or precipitating the $CO_2$ generated from LPR, is regenerated or not regenerated, with carbon emissions potentially being avoided in the latter case. In the case of regeneration, different chemistries are possible, such as in the case of a regeneration cycle utilizing hydroxide anions to precipitate a solid, carbonate form of $CO_2$ that is generated from reforming. Alternatively, a reaction and regeneration system may use carbonate anions to "capture" $CO_2$ and thereby maintain it as aqueous, solubilized bicarbonate form. Specific embodiments and examples described herein are for illustrative purposes, and not limiting of the invention as set forth in the appended claims. The practice of the present invention relates to all beneficial effects that are inherent in this practice. Those having skill in the art, with the knowledge gained from the present disclosure, will recognize that various changes can be made to the disclosed processes, in attaining the advantages described herein and other advantages, without departing from the scope of the present disclosure.

What is claimed is:

1. A process for reforming an oxygenated C,H-containing compound, the process comprising:
    contacting the oxygenated C,H-containing compound with a catalyst in an aqueous solution, said aqueous solution comprising at least one $CO_2$-precipitating cation,
    wherein said oxygenated C,H-containing compound is reformed by reaction with $H_2O$ in said aqueous solution, to produce $H_2$ and a precipitated carbonate form of generated $CO_2$ and the $CO_2$-precipitating cation,
    the process further comprising adding, to a post-reforming reactor or post-reforming zone, positioned downstream of a respective reforming reactor or reforming zone in which at least about 90 wt-% of said oxygenated C,H-containing compound is reformed, a further amount of said at least one $CO_2$-precipitating cation.

2. The process of claim 1, wherein the oxygenated C,H-containing compound is an alcohol or an ether.

3. The process of claim 2, wherein the oxygenated C,H-containing compound is selected from the group consisting of methanol, ethanol, and dimethyl ether.

4. The process of claim 1, wherein the least one $CO_2$-precipitating cation is selected from the group consisting of $Ca^{+2}$ or $Li^+$, $Mg^{+2}$, $Sr^{+2}$, $Ba^{+2}$, and mixtures thereof.

5. The process of claim 4, wherein the least one $CO_2$-precipitating cation is added to said post-reforming reactor or post-reforming zone as $Ca(OH)_2$ or LiOH.

6. The process of claim 1, wherein a pH of the aqueous solution is at least about 12.

7. The process of claim 1, wherein a concentration of the least one $CO_2$-precipitating cation in the aqueous solution is at least about 3 normal (N).

8. The process of claim 1, further comprising recovering the generated $CO_2$ by heating the precipitated carbonate form of $CO_2$ and obtaining an oxide form of the $CO_2$-precipitating cation.

9. The process of claim 8, wherein the oxide form of the $CO_2$-precipitating cation is calcined CaO.

10. The process of claim 8, further comprising hydrolyzing the oxide form of the $CO_2$-precipitating cation to obtain a hydroxide form of the $CO_2$-precipitating cation.

11. The process of claim 10, further comprising adding the hydroxide form of the $CO_2$-precipitating cation to the aqueous solution.

12. A process for reforming an oxygenated C,H-containing compound, the process comprising:
    contacting, in a reforming reactor or reforming zone, the oxygenated C,H-containing compound with a catalyst in an aqueous solution, said aqueous solution comprising at least one $CO_2$-precipitating cation and/or at least one $CO_2$-capturing cation,
    wherein said oxygenated C,H-containing compound is reformed by reaction with $H_2O$ in said aqueous solution, to produce $H_2$ and (i) a precipitated carbonate form of generated $CO_2$ and the $CO_2$-precipitating cation and/or (ii) a captured bicarbonate form of generated $CO_2$ and the $CO_2$-capturing cation, the process further comprising:

modifying, in a post-reforming reactor or post-reforming zone, downstream of said reforming reactor or reforming zone, a condition of said aqueous solution to change solubility of (i) said precipitated carbonate form of generated $CO_2$ and/or (ii) said captured bicarbonate form of generated $CO_2$.

13. The process of claim 12, wherein said step of modifying comprises converting at least a portion of said captured bicarbonate form of generated $CO_2$ to said precipitated carbonate form of generated $CO_2$.

14. The process of claim 12, wherein a downstream concentration of the catalyst in said post-reforming reactor or post-reforming zone is less than an upstream concentration of catalyst in said reforming reactor or reforming zone.

15. The process of claim 14, wherein the catalyst is substantially absent in said post-reforming reactor or post-reforming zone.

16. The process of claim 12, wherein said step of modifying comprises adding, to the post-reforming reactor or post-reforming zone, a further amount of said at least one $CO_2$-precipitating cation, a further amount of said at least one $CO_2$-capturing cation, and/or a pH-adjusting anion.

17. The process of claim 12, further comprising:

withdrawing, from the post-reforming reactor or post-reforming zone, a post-reforming effluent, and feeding at least a portion of the post-reforming effluent to a solid-liquid separator to separate (i) at least a portion of the precipitated carbonate form of generated $CO_2$, from (ii) at least a portion of the captured bicarbonate form of generated $CO_2$.

18. The process of claim 17, wherein said at least a portion of the captured bicarbonate form of generated $CO_2$ is obtained in an aqueous filtrate, the process further comprising:

recovering the generated $CO_2$ by contacting at least a portion of the aqueous filtrate with steam in a carbonate regenerator and obtaining a carbonate form of the $CO_2$-capturing cation.

* * * * *